United States Patent [19]

Reed

[11] 4,442,143
[45] Apr. 10, 1984

[54] CATALYTIC CURING OF COATINGS

[75] Inventor: Gordon A. D. Reed, Mount Royal, Canada

[73] Assignee: Liquid Carbonic Inc., Canada

[21] Appl. No.: 372,019

[22] Filed: Apr. 26, 1982

[30] Foreign Application Priority Data

Mar. 3, 1982 [CA] Canada ................................ 397511

[51] Int. Cl.³ .................... C23C 13/04; C23C 13/10
[52] U.S. Cl. ........................................ 427/340; 34/22;
34/23; 34/32; 34/210; 34/229; 118/58; 118/61;
118/66; 118/67; 118/68; 118/718; 118/719;
427/341; 427/255.4
[58] Field of Search ............... 118/719, 718, 61, 58,
118/66–68; 427/340, 341, 248 E, 255.4; 34/210,
229, 23, 32, 22

[56] References Cited

U.S. PATENT DOCUMENTS

| 1,983,764 | 12/1934 | Lane et al. | 118/68 |
| 2,810,662 | 10/1957 | Baneby | 118/68 |
| 2,954,687 | 10/1960 | Yazawa et al. | 68/5 |
| 3,460,359 | 8/1969 | Shiffer | 68/5 |
| 3,927,540 | 12/1975 | Tanaka et al. | 68/5 |
| 4,294,021 | 10/1981 | Turnbull et al. | 118/58 |

FOREIGN PATENT DOCUMENTS

| 2932400 | 2/1981 | Fed. Rep. of Germany |
| 863219 | 3/1961 | United Kingdom |
| 950349 | 2/1964 | United Kingdom |
| 1327099 | 8/1973 | United Kingdom |
| 2008162 | 5/1979 | United Kingdom |

Primary Examiner—Norman Morgerstern
Assistant Examiner—Janyce A. Bell
Attorney, Agent, or Firm—Stevens, Davis, Miller & Mosher

[57] ABSTRACT

A method of curing a wet catalyst-curable resin on a substrate in which the substrate is passed through a treating zone provided by a sealed vapor-curing chamber connected to sealed entrance and exit ante chambers at respective ends. The ante chambers are each separated from the vapor-curing chamber by a wall provided with a passage having height-adjustable means to limit passage of gas. The substrate is passed in turn through the entrance chamber where the boundary layer of air is substantially replaced by inert gas, through the entrance chamber into the vapor-curing chamber where it is exposed to the catalyst vapor, and then through the exit chamber where the curing vapor is removed. When a web provides the substrate, a jet of curing vapor is impinged on the web surface as it enters the vapor-curing chamber at an angle and at a velocity effective substantially to remove the barrier layer of gas and permeate the coating. In starting up the entrance and exit chambers and vapor-curing chamber are purged with inert gas thereby to remove air and on termination of the curing operations the vapor-curing chamber is purged with inert gas to remove curing vapor. Apparatus is disclosed for carrying out the method, featuring height-adjustable doors between the vapor-curing chamber and the entrance and exit chambers. Other features are labyrinth seals and turning vanes adjacent to the passage from one chamber to the other to minimize escape of gas.

14 Claims, 12 Drawing Figures

CATALYTIC CURING OF COATINGS

BACKGROUND OF THE INVENTION

1. Field of the Invention

This invention relates to the vapor-permeation curing of a resinous coating composition.

The invention is particularly applicable to curing coatings of special urethane compositions whose chemistry is described in U.S. Pat. Nos. 3,789,044, 3,833,226, 3,836,491, and Canadian Patent No. 1,005,943.

2. Description of the Prior Art

U.S. Pat. No. 4,105,725 discloses a method and apparatus for generating a steady supply of catalyst vapor, typically triethylamine (TEA) in an inert carrier gas such as nitrogen or carbon dioxide. The invention provides an improved process, operable at ambient temperature, under which catalyst vapor containing typically 4 to 7% TEA, from such a generator may be used to contact a wet vapor-curable film or coating on a substrate to bring about a rapid cure to a dry coating adhering to the substrate. Typically ambient temperatures by the use of the invention, are 70° to 85° F. and curing time 10 to 90 seconds.

A preferred use of the process is in treating a web, having on its surface a coating of catalyst-curable synthetic resin, through a vapor curing chamber. Catalyst vapor is injected into the chamber to create an atmosphere of the vapor in contact with the coating on the web passing through it and means is provided at the entry and the exit of the chamber to minimize the ingress or egress of gases.

It is well known, by analogy with momentum and heat transfer, that mass transfer will proceed at the most rapid rate when the flow is normal to the substrate as opposed to tangential. Hence, this design calls for impingement of catalyst vapor normal to the substrate. If this cannot be achieved, for some reason, then the design must provide for turbulent flow (high Reynolds number) of the catalyst vapor at the coating/catalyst interface.

One of the problems is that a web, on its passage into a treating chamber from the atmosphere, entrains with it a boundary layer of air which interferes with the access of the catalyst vapor to the coating. Furthermore, air carried into the chamber, by the web, tends to create an explosive atmosphere. Further the catalyst laden atmosphere tends to escape from the chamber which represents the principal cost of the process.

The present invention is aimed at overcoming these disadvantages and at providing certain positive advantages as will be evident from the following description.

SUMMARY OF THE INVENTION

According to the invention, ante chambers are provided at the entrance and exit ends of the vapor curing chamber. Restricted passages are provided between the vapor curing chamber and the ante chambers for the entrance and exit of the web and appropriate sealing means is provided to minimize the entry of gas to and from the chamber. The ante chambers are also provided with an entrance and an exit respectively from the outside equipped to minimize the ingress or egress of gas. In accordance with the invention, means is provided for injecting an inert or scouring gas into the ante chambers to provide therein an inert atmosphere. In this way the boundary layer of air on the coated surface is replaced by inert gas before the web enters the vapor curing chamber; by balancing the flows of scour and catalyst gas a pressure balance can be achieved to minimize loss of catalyst vapor and its dilution by the inert scour gas. Means, near the entrance of the curing chamber, is provided for impinging catalyst vapor against the coated surface and promote the permeation of the catalyst into the coating. The chamber is also provided with an atmosphere of curing vapor continuously supplied from the generator.

In accordance with one aspect of the invention, where the coated substrate is a web, the entrance and exit to the vapor curing chamber is a shallow passage provided with a labyrinth seal adapted to cause eddies of gas hindering the overall escape of vapor or gas through the passage. In an alternate arrangement a turning vane is provided to scoop gas from the surface of the web and divert it upwards. In another form of the invention where the substrate is the surface of a three dimensional article, the passage is deeper and provided with a door which can be raised and lowered so as to allow entry and exit of three dimensional articles while minimizing the escape of vapor or gas. Desirably, the door is opened and closed automatically on a signal caused by sensing the movement of the three dimensional article.

According to a preferred aspect of the invention, there are means for impinging the curing vapor on the surface of the substrate at an angle and velocity effective to substantially eliminate the barrier layer of gas entrained on the coated surface and permit the catalyst to permeate the coating and promote the curing of the resin.

The inert gas connections to and from the entrance and exit chambers and from the vapor curing chamber are such that the system may be purged with inert gas prior to startup, and again when operations are finished. This eliminates the danger of the system retaining explosive mixtures.

BRIEF DESCRIPTION OF THE DRAWINGS

Having thus generally described the invention, it will be referred to more specifically by reference to the accompanying drawings, which illustrate preferred embodiments, and in which.

DESCRIPTION OF THE PREFERRED EMBODIMENTS

Figure 1:
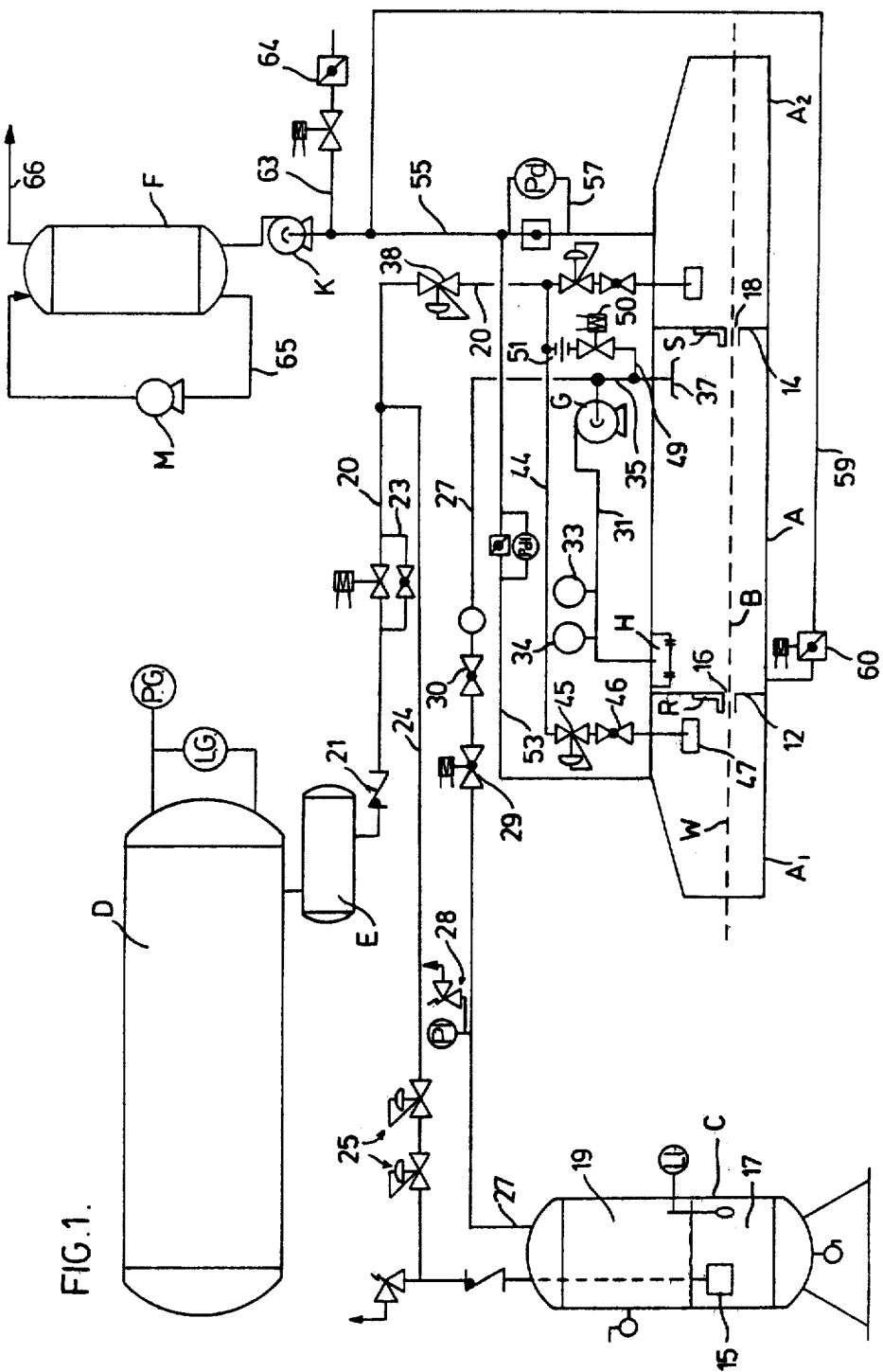
FIG. 1 is a diagrammatic illustration of a vapor curing installation according to the invention.
Figure 2:
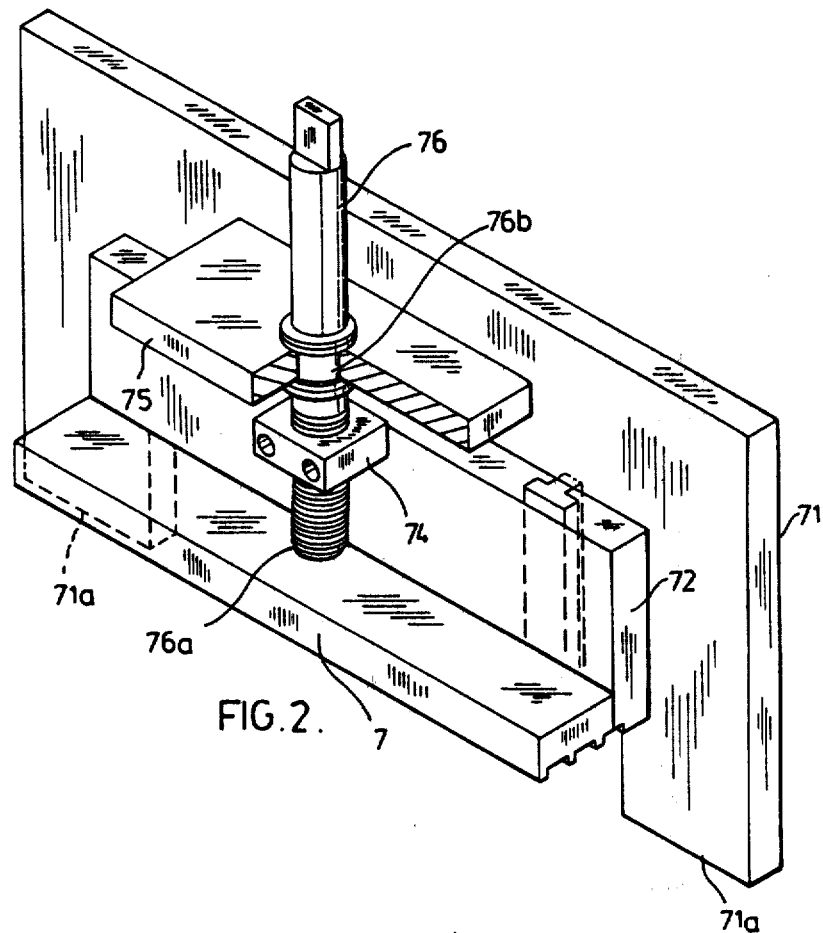
FIG. 2 is a perspective view of a labyrinth seal arrangement forming part of the installation of FIG. 1.

FIG. 1 is a schematic view showing a general arrangement of an apparatus according to the invention. The apparatus includes a vapor curing chamber A having entry and exit ante chambers $A_1$ and $A_2$, separated from the chamber A by partitions 12 and 14 respectively. The partitions 12 and 14 are provided with entry and exit gaps 16 and 18 respectively. The gap 16 is provided with a labyrinth seal R and the gap 18 with a labyrinth seal S. Preferred labyrinth seals are described later. A conveyor belt B, for carrying a web of material having its upper surface coated with an uncured resin to be cured in the vapor cutting chamber A, runs through the chambers $A_1$, A and $A_2$, entering the chamber A through a restricted opening in the wall 10 and leaving the chamber A through a restricted opening in the wall 12. The ends of the respective chambers $A_1$ and $A_2$ are also provided with entry and exit openings for the belt B, for example two inches in height.

CATALYST VAPOR DELIVERY

C is a generator for catalyst vapor and D a carbon dioxide storage tank, E a vaporizer, and F a catalyst vapor scrubber.

A vapor of a catalyst, for example, an amine, is generated by bubbling carbon dioxide through a sparger 15 into a liquid body of catalyst 17 in the generator C, which is a catalyst vapor generator of the type described in Canadian Patent No. 1,002,490, Ross, issued Dec. 28, 1976, provided with a pressure gauge 18 and a level indicator 20. Carbon dioxide, contained in the storage tank D, having a pressure gauge 22 and a level indicator 24, in liquid form, is passed through a vaporizer E, into the line 20, past a check valve 21, through a solenoid operated flow control valve 23, and through a supply line 24, past a two-stage pressure regulator 25, thence to the sparger 15. This creates a continuously renewing supply of gas mixture consisting of $CO_2$ and a proportion of catalyst in vapor form in a chemical equilibrium with the liquid, as determined by the liquid temperature.

The catalyst vapor is passed to the chamber A on demand as follows. The vapor leaves the generator through the line 27 past a pressure indicator 28, a safety valve 29, a flow indicator 30 through a recirculating blower G to a line 31, past an oxygen analyzer 33, for example a TELEDYNE 340A (trade mark) and a gas chromatograph 34, for example Hewlett Packard (trade mark) to an applicator H which jets the gas vapor against the wet resin coated web. The vapor from the chamber A may be recirculated by the blower G to the applicator H through the exhaust 37 and line 35 to line 31.

The structure and operation of the applicator H will be described later in more detail.

INERT GAS DELIVERY

The line 20 continues past the line 24 through a downstream pressure regulator 38 through a regulator 39 and block control 40 to an inert gas ejector 41 within the ante chamber $A_2$. Scouring lines 44a and 44b branch off from the line 20 and lead through a regulator and block controls 45a and 45b and 46a and 46b to inert gas injectors 47a and 47b in the ante chambers $A_1$ and $A_2$ respectively. A purge line 49 connects the lines 44a and 35 through a solenoid purge valve 50 (falls open) and a flow limiting orifice 51 to prevent more than a given flow rate.

An exhaust line 53 leads from the ante chamber $A_1$ through a flow control 57 to a line 55, leading through a blower K to the catalyst vapor scrubber F. The line 55 also leads from the ante chamber $A_2$ through another flow control valve 57.

A purge line 59 leads from the entry end of the vapor curing chamber A through a purge valve 60 (which opens on signal to purge) to a connection with the line 55.

A balance line 63 leads into the line 55 from a shut-off valve, damper or flow control valve 64.

An acid recirculating line 65 leads from the bottom to the scrubber F through a pump M. A purified waste gas (mostly air) line 66 leads from the top of the scrubber F.

PURGING OPERATIONS

Prior to starting the curing operation, the vacuum curing chamber A must be purged of air. To this end, the labyrinths R and S are closed to isolate the chamber A from the ante chambers $A_1$ and $A_2$. The valves from the liquid carbonic vaporizer E are opened so that the gas passes down through the line 20 and the solenoid valve 49 and flow-limiting orifice 51 and gas is delivered into the chamber A through the port 37. The blower G is turned on. At the same time, the purge valve 60 is opened and air withdrawn from the vacuum curing chamber through the line 59 up through the blower K to the scrubber F. Once the chamber A has been purged of air and filled with inert gas the curing operation may start. The valve 50 is closed.

If, during the operation, the oxygen monitor 33 shows that there is more than a predetermined maximum of oxygen in the line 31, the vacuum curing chamber may also be purged in the same way.

CURING OPERATION

The flow of catalyst vapor is started through the line 27 initially at a high rate through the blower G and the line 31 to the inert gas delivery device H. The labyrinth R is closed to prevent ingress of gas to the ante chamber $A_1$. The labyrinth S allows the escape of a certain amount of gas into the ante chamber $A_2$ under suction from the blower K. Normally it will take a few minutes to build up, in the chamber A, the concentration of catalyst needed for curing, as will be shown by the hydrocarbon analyzer 34. Then, the material to be cured can be fed into and through the chamber A, the labyrinths R and S being set to the desired clearance.

In accordance with the invention, the ante chamber $A_1$ is provided with the appropriate concentration of inert gas by appropriate adjustment of the inert gas delivery. At the same time, as the wet web W of material on the conveyor B passes into and through the ante chamber $A_1$, the boundary layer of air is eliminated and replaced by a boundary layer of inert gas which fills the chamber $A_1$ under supply from the vaporizer E.

The applicant has determined that with the help of predetermined orifices, and the careful adjustment of inert scour gas flows in both ante chambers the escape of catalyst vapor in the chamber can be minimized.

The applicant has found that an important aspect of effective curing is to ensure that catalyst molecules penetrate the boundary gas layer and permeate the coating by dissolving in its solvent component. To this end, the inert gas is injected through the injector H in such a manner as to remove this boundary layer to a predetermined degree. This operation will be described later in more detail.

THE LABYRINTH SEAL

Figure 3:
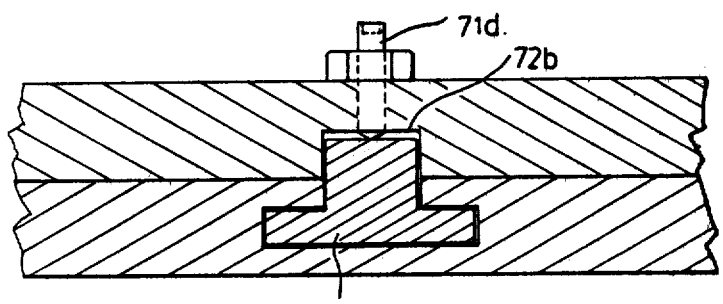
FIG. 3 is a fragmentary cross-section along the line 3—3 of FIG. 2.
Figure 4:
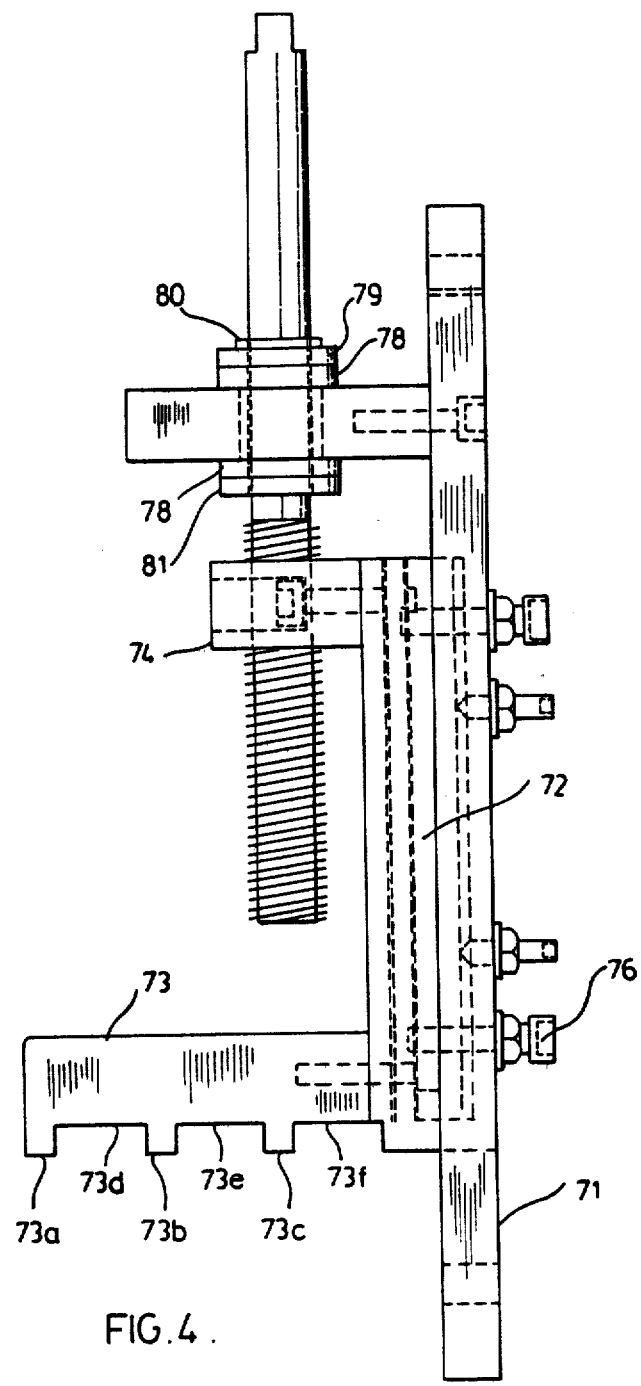
FIG. 4 is a side elevation of the arrangement shown in FIG. 2.
Figure 5:
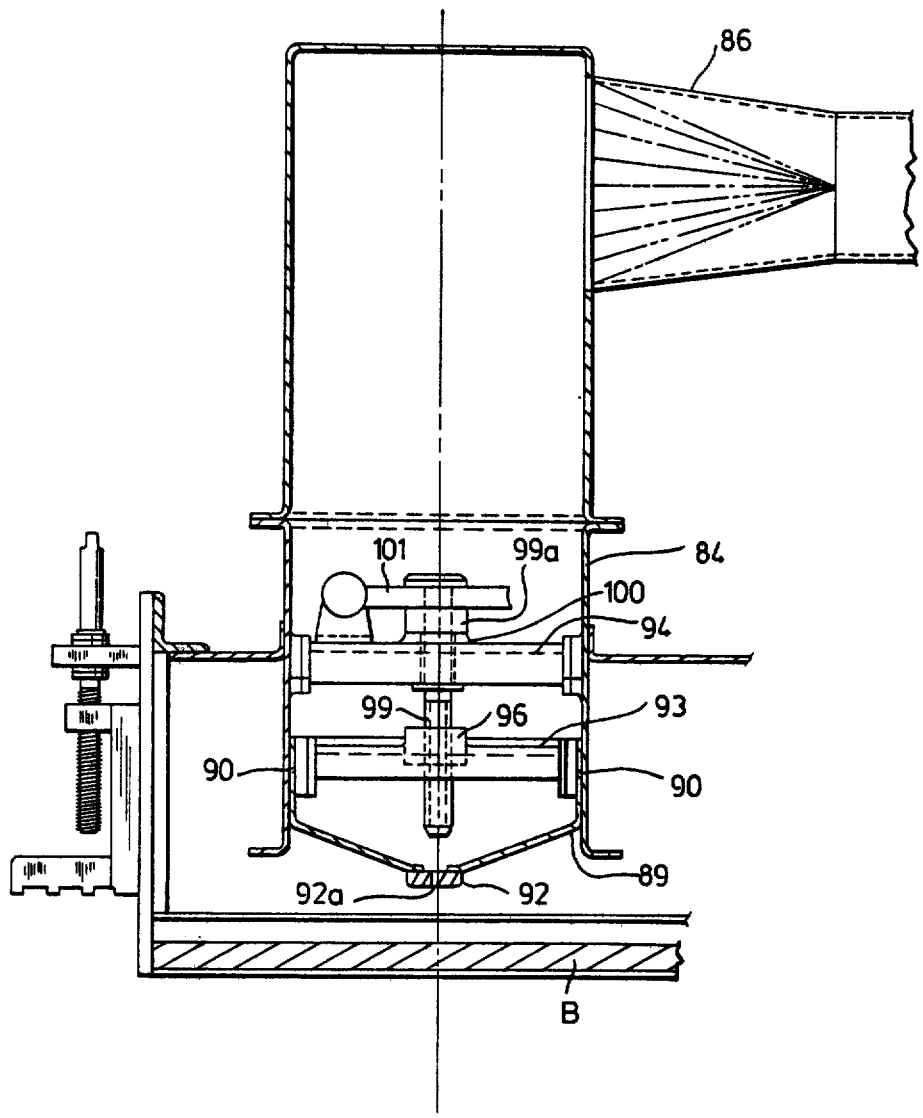
FIG. 5 is a vertical cross-section partly in elevation through the vapor applicator of the installation of FIG. 1 taken in the direction of travel of the conveyor belt.

Referring more particularly to FIGS. 3, 4 and 5, the details of the labyrinth seal R are as follows.

A main support panel 71 is mounted on the wall 12 and is supported from the floor of the chambers A, $A_1$ by integral feet 71a. A movable support panel 72 is mounted on the panel 71 for up and down sliding movement, by being provided with T-slots 72a which are engaged by a T-guide 71b bolted to the support panel 71 by bolts 71c. Cone-point socket set screws 71d, through the panel 71, are adapted to hold the panel 72 in a predetermined vertical position. A horizontal screw support plate 75 projects from the panel 71 and is bolted to the panel 71 by bolts 71e extending through it.

A screw driven-plate 74 is bolted to the top of the support 72 and is provided with a tapped bore. A screw 76 having a bottom threaded part 76a and a top cylindrical part 76b extends through the support 75. The threaded part 76a engages the tapped bore in the driven-plate 74.

Surrounding the screw 76, above the plate 75, are a bearing flange 79, a collar spacer 78, and a retaining ring 80 respectively, the latter engaging an annual groove in the part 76b. Surrounding the screw 76, below the screw support 75, is a thrust-bearing 81 and a collar spacer 78.

Mounted on the bottom of the plate support 72 and secured by cap screws 76, is a horizontally protruding foot plate 73 having its underside provided with alternating elongated ribs 73a, 73b, 73c, and grooves 73d, 73e and 73f respectively.

In operation the support plate 72 is set to a desired height and clamped in position by the cone point socket set screws 82. Then, labyrinth foot 73 is manipulated up or down as desired through rotation of screw 76, to set the gap above the substrate carrying the coating layer to be cured.

THE APPLICATOR DEVICE

Figure 6:
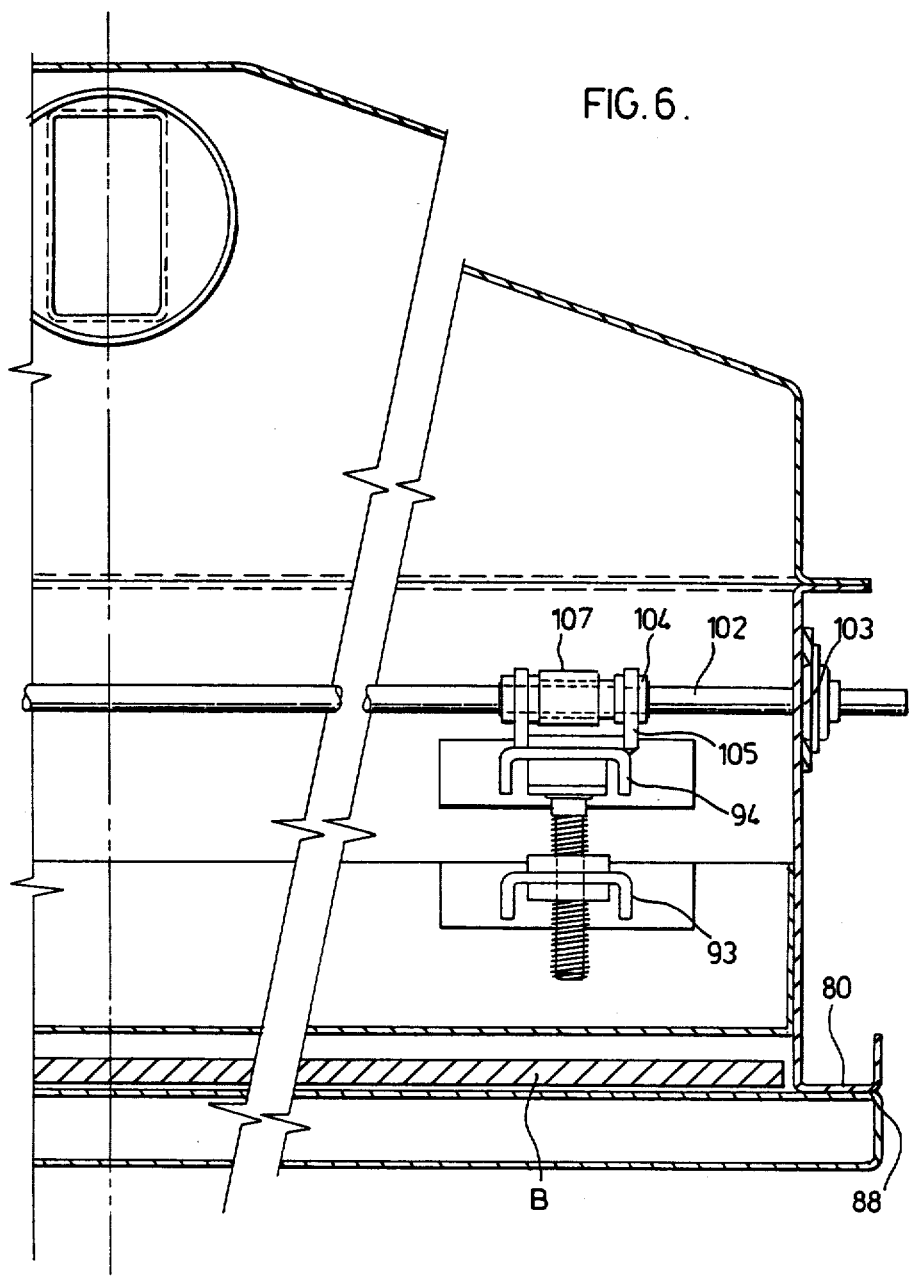
FIG. 6 is a vertical cross-section through the vapor applicator of FIG. 1 taken transversely to the direction of travel of the conveyor belt.

FIGS. 5 and 6 show, in detail, the applicator device for applying the curing vapor.

This includes a housing 84 extending within the Chamber A and receiving vapor from a supply conduit 86. The housing 84 extends downwards to supporting footings 80 resting on cross members 88 on each side of the chamber A, so that the housing 84 extends across the belt B. Slidable vertically within the housing 84 is an applicator nozzle chamber 89, having vertical sides 80 which slide against the sides of the housing 84. The nozzle chamber 89 has an inwardly extending part 91 carrying a centrally arranged elongated nose-piece 92, provided with an elongated slot 92a which extends across the chamber A above the belt B. The slot 92a is directed at a slight angle towards the entrance of the chamber A for purposes to be described in more detail.

For the purposes of adjusting the height of the nose-piece 92 relative to the work, the following arrangement is provided. Vertically spaced-apart, upper and lower inverted channel members 93 and 94 extend between the walls 90 of the nozzle chamber and the walls of the housing respectively being welded to plates 94, in turn, welded to the said walls. The channel member 93 is provided with an opening, within which is welded a tapped bearing 96. The upper channel member 93 is provided with an opening about which there is a fixed bearing 98 having a smooth bore. An adjusting screw 99, having a lower threaded part and an upper smooth part, is mounted so that the threaded part engages the tapped opening in the bearing 96 and the smooth part slides in the bearing 93.

The screw 99 has a head 99a which bears on a washer 100 welded on top of the beam 94. Surrounding the head 99 is a Boston gear 101. A rotatable rod 102 is mounted in bearings 103 at respective sides of the housing 89 and extends through bearings 104, held in spaced-apart supports 105, welded to and extending upward from the upper beam 94. Between the supports 105, the rod 102 carries a gear 107 which operatively engages the gear 101. The nozzle part 89 may thus be raised or lowered by rotating the rod 102.

ALTERNATIVE ARRANGEMENT

Figure 7:
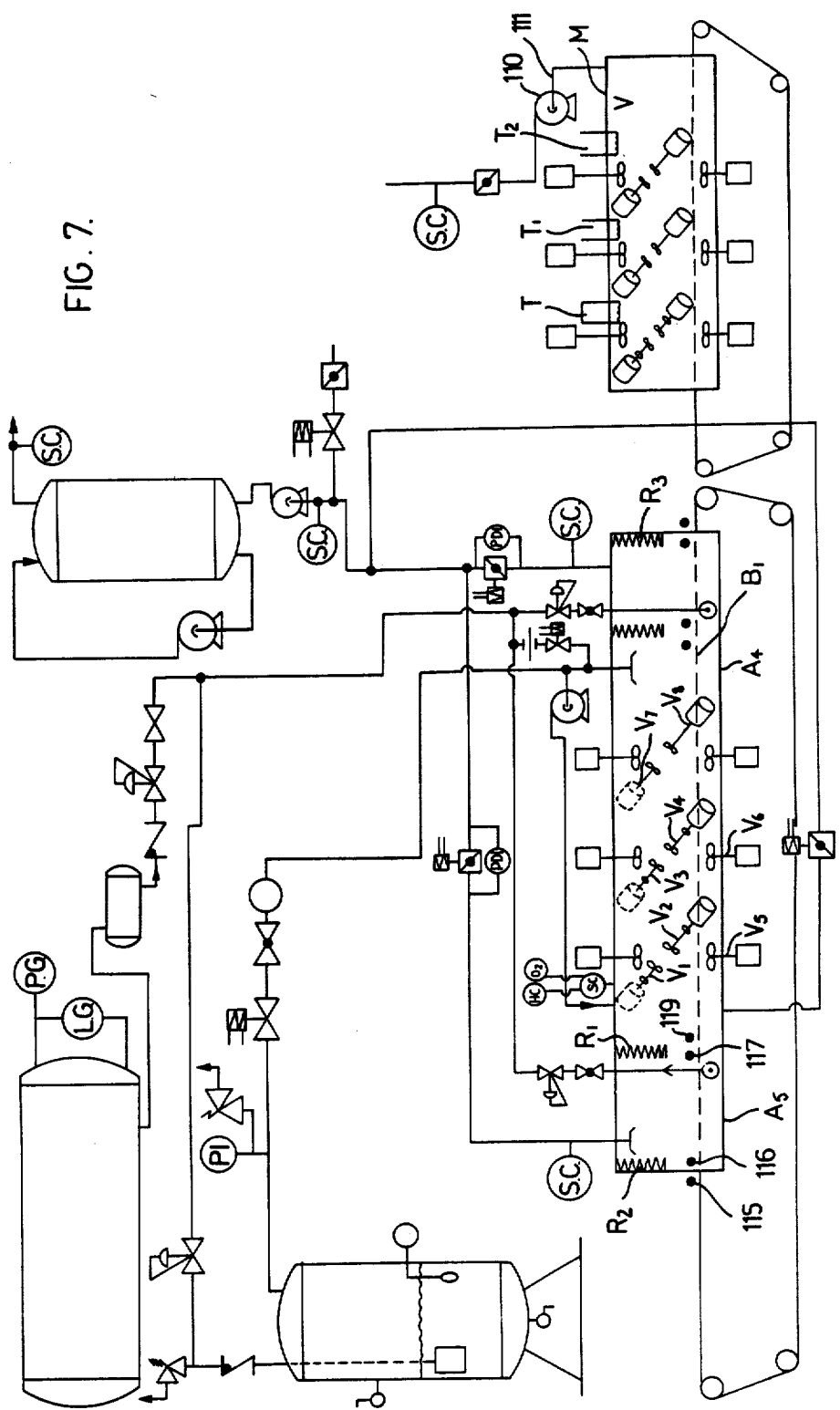
FIG. 7 is a diagrammatic view similar to FIG. 1 showing an alternative vapor curing installation according to the invention, followed by a drying chamber, in series with the curing chamber.

An alternative arrangement of vapor curing chamber is shown in FIG. 7. Similar reference numerals have been applied as to FIG. 1 with the exception that they have been raised into the 200's and the same letters have been used to identify similar parts, but have been given a different subscript.

The alternative arrangement shown is for curing resin coating on three dimensional articles which project upwards from the carrying belt $B_1$, as opposed to the arrangement, shown in FIG. 1, which is specially adapted for curing resin on a flat surface, for example, that of a web.

In the arrangement of FIG. 7 the labyrinth seals R and S are replaced by folding doors $R_1$ and $S_1$ between the curing chamber $A_4$ and the ante chambers $A_5$ and $A_7$ respectively. Likewise, the respective entrance opening and exit openings to the ante chambers $A_5$ and $A_7$ are replaced by sliding doors $R_2$ and $R_3$ respectively.

In this embodiment of the invention, a number of fans $V_1$, $V_2$, $V_3$, $V_4$, etc. are provided within the vapor curing chamber $A_3$ to improve the circulation of curing vapors throughout the chamber thus achieving the turbulance (high Reynold member) which are important for high speed operation.

Drying oven M receives the articles from the chamber $A_7$. M is an enclosed chamber through which a belt $B_2$ extends to convey the articles delivered from the belt $B_1$. The chamber M is fed through a blower 110 with air through a delivery pipe 111. Fans $V_{11}$ through $V_{20}$ serve to circulate the air in the drying oven. Heaters T, $T_1$ and $T_2$ provide the necessary heat within the oven M.

The operation of the apparatus of FIG. 7 will follow readily from the understanding of the operation of the apparatus of the previous Figures.

A three dimensional article whose surface is coated with curable resin is allowed to enter through the door $R_1$, which is automatically opened by an article passing the photoelectric cell 115 and is closed again when the article passes the cell 116. Likewise, as the article is conveyed along the belt $B_1$, passing the cell 117 phases the door $R_1$ and is closed again by the article passing the cell 119. The article passes through the curing chamber $A_4$ and out through the door $R_3$ which is automatically opened and closed by the electric eyes 121 and 123 and the article is then delivered onto the belt $B_2$ which carries it through the drying oven.

Figure 8:
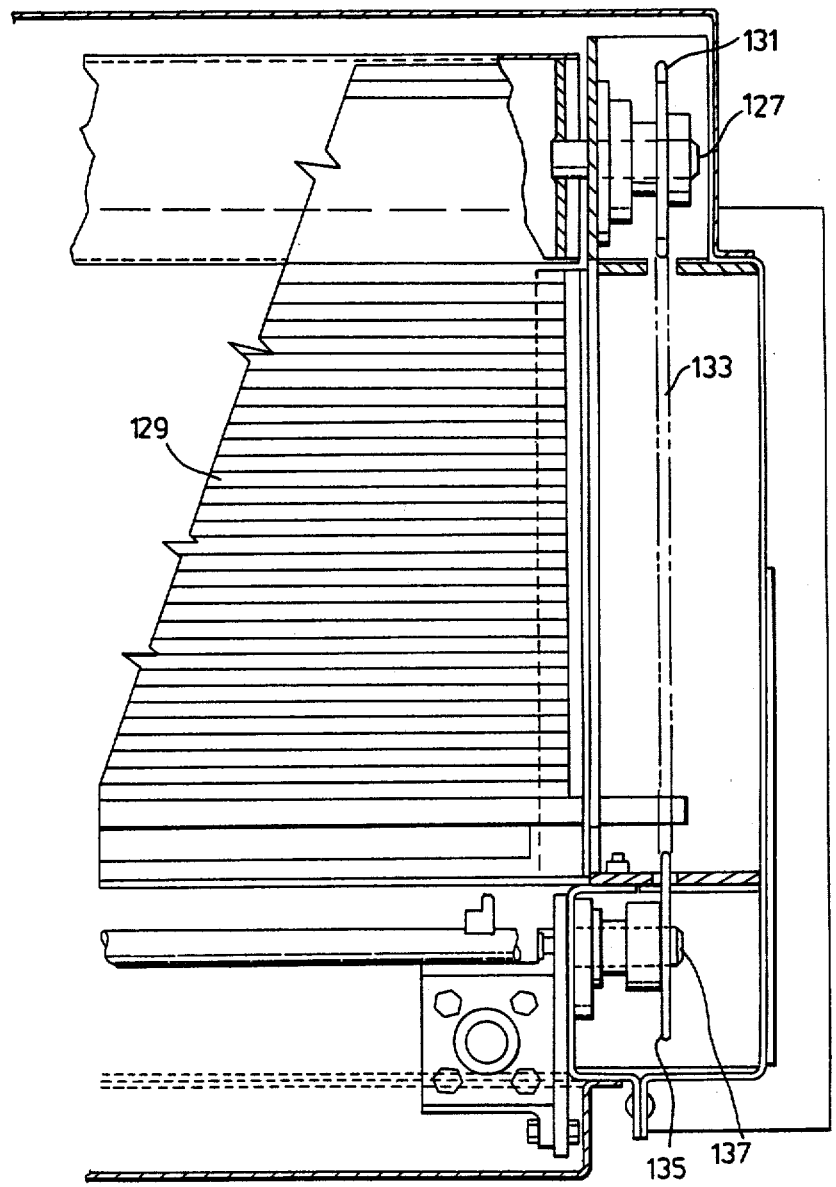
FIGS. 8 and 9 are elevations showing a folding door arrangement used with the installation of FIG. 7.
Figure 9:
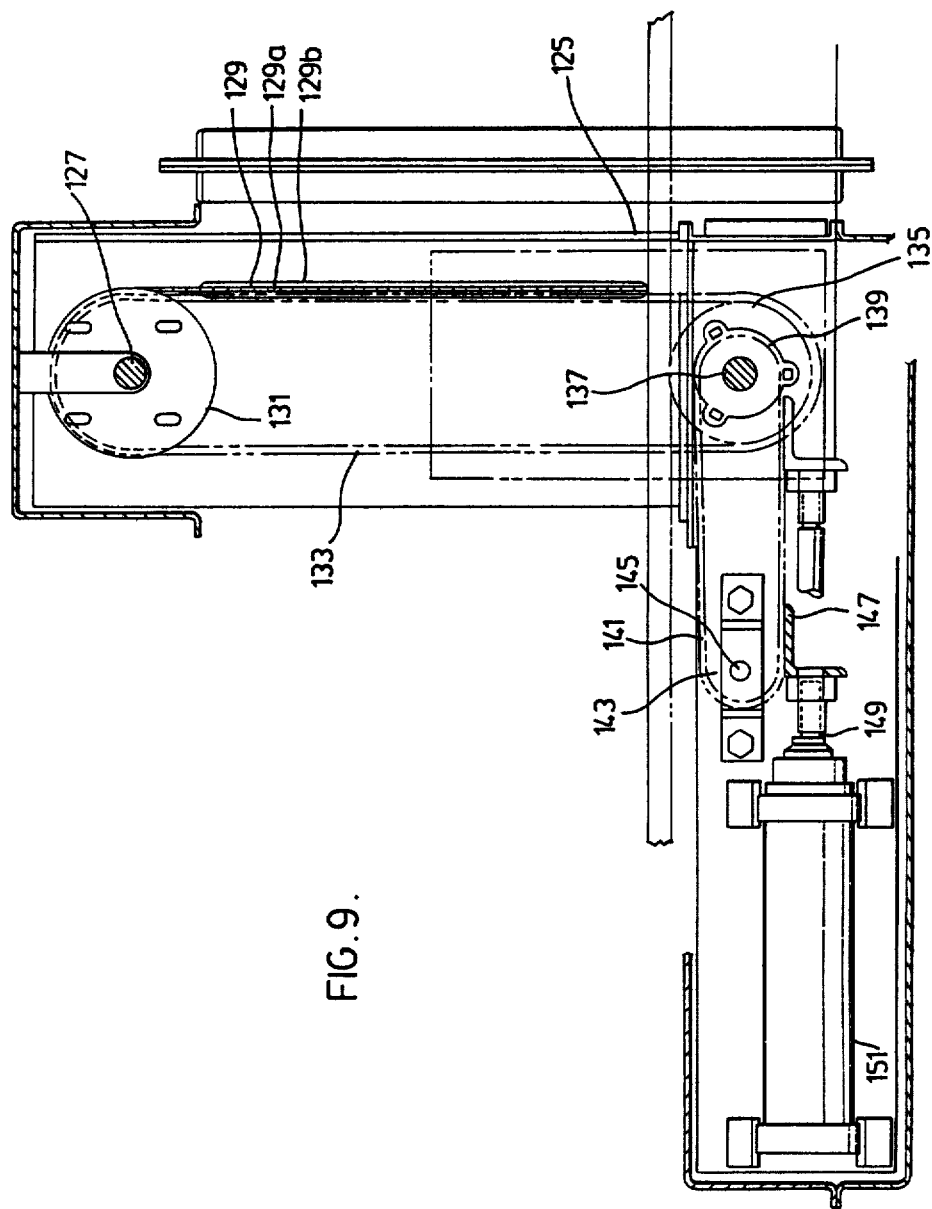

FIGS. 8 and 9 show in side elevation and in end elevation (transversely to the movement of the belt) a door assembly as used in the alternative arrangement.

This door assembly is mounted from a side frame 125 which is secured to side frames 124 which are connected to the side frame of the curing chamber or the ante chamber as the case may be. A rotatable rod 127 extends from the side frame and accommodates the roll-up collapsible door 129 which is made up of a series of parallel slats 129a covered by a fabric sheath 129b for example of Teflon. The shaft 127 carries a sprocket 131 around which there is operative an endless chain 133 which extends downwards and about a sprocket 135 mounted on a shaft 137 which extends from side frame to side frame. The shaft 137 carries a driving sprocket 139 which is driven by a chain 141 which extends about a sprocket 143 mounted on a shaft 145. The chain 141 is connected by a K-1 attachment 147 to a rod 149 which is connected to the piston of a cylinder 151.

Means (now shown) is provided for operating the piston 151 so that the rod 149 is moved back and forth thus moving the chain 141 to open the door 129 or close it as the case may be.

Figure 10:
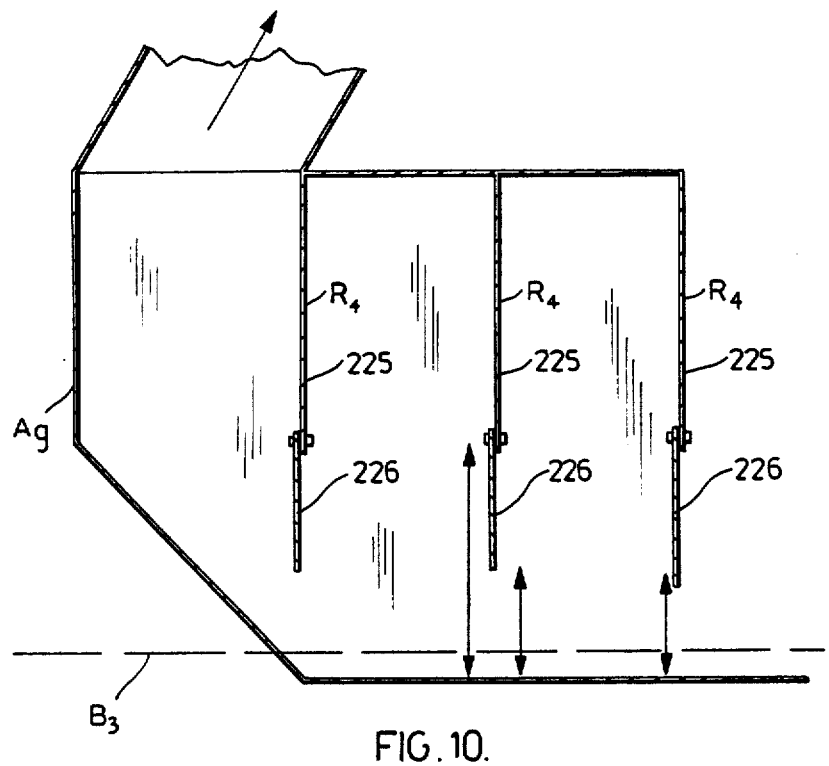
FIG. 10 is a diagrammatic vertical cross-section showing an alternative simplified entrance/exit chamber with labyrinth sections.

FIG. 10 shows a simplified entrance/exit chamber $A_9$. A series of baffles $R_4$ are provided each made up of a fixed segment 225 and a movable segment 226 secured by set screws to the fixed segment. The gap between the bottom of the movable segment 226 and the belt $B_3$ may thus be adjusted.

Figure 11:
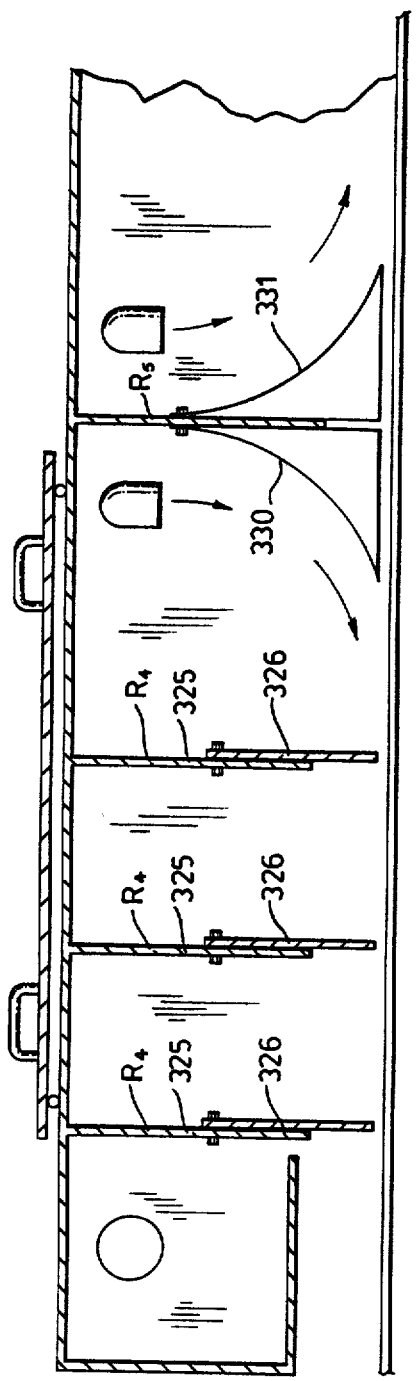
FIG. 11 is a view similar to that of FIG. 10 showing an alternative arrangement.

FIG. 11 shows an alternative arrangement useful for webs requiring baffle gaps of ¼ inch or greater. This figure is similar to FIG. 10 with the digits and tens of the reference numerals identifying similar parts except that they have been raised into the 300's and the letters have been given a higher subscript. A baffle $R_5$ is provided between the ante chamber to its left and the vapor treating chamber to its right. Adjustably mounted for up and down movement on the baffle $R_5$ are turning vanes 330 and 331 respectively. The scour jet played against the turning vane 330 directs it left along the surface of the web in the direction opposite to its travel. The catalyst vapor played against the turning vane 331 directs it along the surface of the web in the direction of its travel. Often the impingement turning vane is sufficient to reach a balance of scour and catalyst mixture flows.

The web enters the exhaust ante chamber to the left of the first baffle 326 and goes under that baffle. The air that is drawn in with the web dilutes any curing vapor escaping under the baffle and the mixture is drawn upwards through the slot 327 into the exhaust chamber 328. Then, the web advances from the first baffle 326 and goes under the second baffle 326 and then the third baffle 326. The baffles 326 create between them a pressure break. Then, the web enters a scouring chamber where scouring gas is supplied, for example, $CO_2$.

When the web reaches the turning vane 330 at the outlet of the scouring chamber, the atmosphere above the web is mostly scouring gas, which is scooped off at that point except for a thin boundary layer of say ¼ of an inch. The web then enters the curing chamber. By that time, the flow of scouring gas will have equalized the pressure between the scouring chamber and the curing chamber so there is little gas flow from one to the other, except that a small amount of curing vapor may escape from the curing chamber into the scouring chamber and will be drawn into the exhaust chamber. The turning vane 331 tends further to prevent the escape of turbulent curing vapor from the curing chamber, by diverting it upwards from the web.

Figure 12:
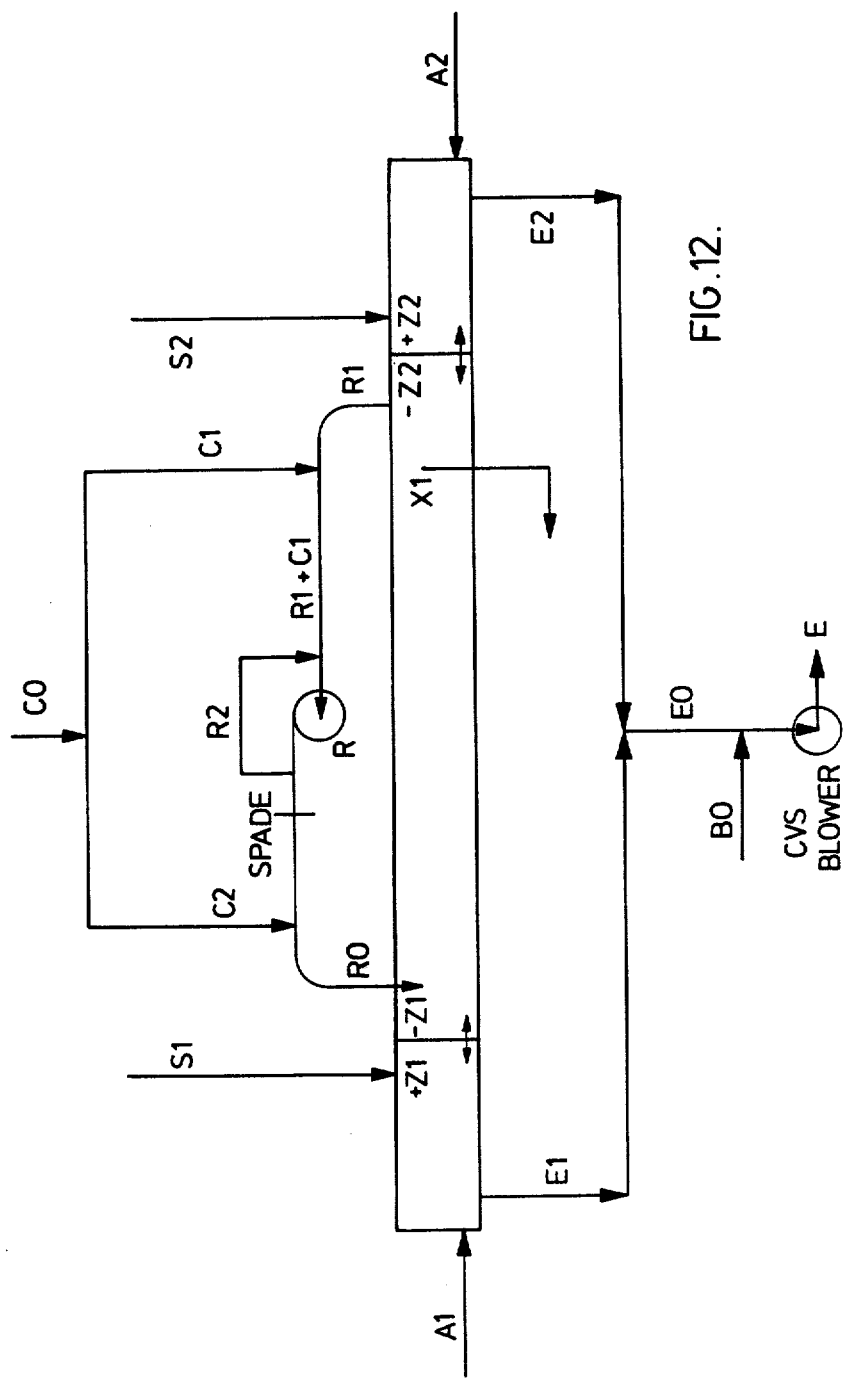
FIG. 12 is a diagram showing vapor curing chamber gas balance equations.

FIG. 12 is a diagram showing vapor curing chamber gas balance equations, in which symbols are as follows:

C O, 1,2 = Catalyst gas mixture flow
R O, 1,2 = Recycle (impingement)
E O, 1,2 = Exhaust flow
A 1,2 = Air dilution
S 1,2 = Scour
B O = Balance air
X 1 = Sample gas
±Z 1,2 = In/out Vcc flow
Equations in FIG. 11 are as follows:

(1) $CO = C1 + C2$ $$(2)\ RO = C2 + R1 + C$$
$$= CO + R1$$

(3) $R - R2 = R1 + C1$
(4) $E1 = A1 + S1 \pm Z1$
(5) $E2 = A2 + S2 \pm Z2$
(6) $EO = E1 + E2$
(7) $E = EO + BO$

The embodiments of the invention in which an exclusive property or privilege is claimed are defined as follows:

1. An apparatus for curing a wet catalyst-curable resin on a substrate with a vapor containing a catalyst, comprising, a treating zone provided by a sealed vapor-curing chamber connected to a sealed entrance chamber at one end and a sealed exit chamber at the other end, the entrance and exit chambers each being separated from the vapor-curing chamber by a wall, each wall being provided with a passage, each passage being provided with height adjustable means to limit the escape of vapor from the curing chamber, conveying means running through the treating zone, a curing vapor generator, a source of inert gas, a connection from the inert gas source to the generator, an impinger near the entrance of the vapor-curing chamber for projecting catalyst vapor against the substrate, and a connection from the vapor generator to the impinger, connections from the inert gas source to the vapor-curing chamber and to the entrance and exit chambers, exhaust and scrubber means, connections from the vapor-curing chamber and entrance and exit chamber to the exhaust and scrubber means, means for flushing inert gas, from the gas source, through the vapor-curing chamber to the exhaust and scrubber means, for purging the vapor curing chamber, a connection from the inert gas source to the entrance chamber to provide it with an atmosphere of inert gas to replace the boundary layer of air on the substrate passing through it with a boundary layer of inert gas, a connection from the inert gas source to the exit chamber to provide it with an atmosphere of inert gas to replace the boundary layer of curing vapor with inert gas, and control means for controlling the respective gas and vapor connections to balance scour flow and catalyst to achieve minimum dilution of the catalyst vapor and to maintain minimum catalyst concentrations in the chamber.

2. An apparatus, as defined in claim 1, which is for curing the catalyst curable resin on a web as the substrate, each of the passages being shallow horizontal gaps provided with a labyrinth seal to cause turbulence in the gas moving past it thereby producing eddies in the gas flow for impeding flow of gas through the passages.

3. An apparatus, as defined in claim 1, which is for curing the catalyst curable resin on the surface of a three dimensional article as the substrate, the passages being of a height to allow movement therethrough of said article and being provided with a vertically movable barrier to limit the escape of gas through the passages, means for sensing the article thereby to raise and lower the barrier allowing entrance and exit of the article.

4. An apparatus, as defined in claim 2, in which the means within the vapor-curing chamber for impinging on the coated surface of the substrate, at a predetermined angle, a curing vapor at a resultant velocity is effective to substantially eliminate the barrier layer of gas without displacing the vehicle from the surface and permit the catalyst to permeate the coating.

5. A method for curing a wet catalyst-curable resin on a substrate in which the substrate is passed through a treating zone provided by a sealed vapor-curing chamber connected to a sealed entrance chamber at one end and a sealed exit chamber at the other, the entrance and exit chambers being separated from the vapor-curing chamber by a wall provided with a passage having height adjustable means to limit the escape of vapor from the vapor sealing chamber, comprising, providing the entrance chamber with an atmosphere of inert gas, providing the vapor-curing chamber with an atmosphere of curing catalyst vapor, providing the exit chamber with an atmosphere of inert gas, passing the substrate through the entrance chamber whereby a boundary layer of air is substantially replaced by inert gas, passing the substrate from the entrance chamber into the vapor-curing chamber whereby it is exposed to the catalyst vapor in sufficient concentration to cure the resin, passing the substrate from the vapor-curing chamber into the exit chamber whereby the curing vapor is removed, providing flow controlling means to balance the flow of inert gas in the entrance/exit chamber with catalyst vapor flow to minimize escape/dilution of the latter.

6. A method, as defined in claim 5, in which the substrate is a web and a jet of curing vapor is impinged on the surface of the web as it enters the vapor-curing chamber thereby to substantially remove the barrier layer of gas and permeate the coating.

7. A method, as defined in claim 6, in which the method is initiated by purging the entrance and exit chambers and vapor-curing chamber with inert gas thereby to remove air and on termination of the curing operations the vapor-curing chamber is purged with inert gas to remove curing vapor.

8. An apparatus for catalyst-curing a resin on the upper surface of a substrate web in which the sheet is passed through a vapor-curing chamber past a wall having an entry gap for the web, and there is means for limiting the escape of catalyst vapor from the chamber through said gap, in which, said means comprises a labyrinth seal on said wall in advance of the gap, said seal having a horizontal arm provided with a plurality of channels elongated transversely to the feed direction of the web adjustably positioned close to the coated substrate to cause turbulence in the gas moving past it thereby producing eddies in the gas flow for impeding the exit of gas from the vacuum curing chamber.

9. An apparatus for catalyst-curing a resin on the upper surface of a substrate web in which the sheet is passed through a vapor-curing chamber past a wall having an entry gap for the web, and there is means for limiting the escape of catalyst vapor from the chamber through said gap, in which, said means comprises a turning vane connected to said wall and having a surface leading upwards from a lower edge just above the web.

10. An apparatus as defined in claim 9 in which the turning vane is adjustably mounted on the wall so that the elevation of its lower edge can be adjusted relative to the web.

11. An apparatus for catalyst curing a resin on the upper surface of a three dimensional article, in which the article is passed through a vapor-curing chamber past a wall having an entry passage for the article, and there is means for limiting the escape of catalyst laden vapor from the chamber through the passage, in which, said means comprises a vertically movable door for said passage, means for moving the door vertically, and sensing means for sensing an article approaching or leaving the door whereby the door is raised and lowered to allow entry and exit of the article.

12. In an apparatus for catalyst-curing a film of resin on the surface of a substrate web in which the web is moved through a curing chamber from an entrance wall gap to an exit wall gap, an impinger apparatus comprising a plenum fixedly mounted in a position above the path of the substrate near the entry wall, the plenum being made up of a housing having vertical walls and held in fixed position, an applicator element having a nozzle mounted for raising and lowering in said housing to vary the distance of the nozzle from the substrate.

13. In a method of catalytic curing of a coating on a substrate in which a substrate coated with a wet uncured catalyst curable resin is conveyed into and through a vapor-curing chamber, the step of, scouring from the surface of the substrate before it enters the curing chamber the adhering boundary layer of air and replacing it by a boundary layer of inert gas.

14. In a method of catalytic curing of a coating on a substrate in which a substrate coated with a wet uncured catalyst-curable resin is conveyed into and through a vapor curing chamber, the steps of, scouring from the surface of the substrate the adhering boundary layer of air and replacing it by a boundary layer of inert gas, and projecting curing vapor against the surface under pressure effective to displace the boundary layer of inert gas without displacing the wet resin.

* * * * *